United States Patent
Leme et al.

(10) Patent No.: US 9,263,816 B1
(45) Date of Patent: Feb. 16, 2016

(54) RETENTION MEMBER FOR USE WITH AN ELECTRICAL JUNCTION BOX

(71) Applicant: TYCO ELECTRONICS BRASIL LTDA., Sao Paulo (BR)

(72) Inventors: Rafael Kazuo Sato Toledo Leme, Braganca Paulista, SP (BR); Jose Roberto Goldschmidt, Campinas (BR); Peterson Pulgrossi, Campinas SP (BR)

(73) Assignee: TYCO ELECTRONICS BRASIL LTDA, Sao Paulo (BR)

( * ) Notice: Subject to any disclaimer, the term of this patent is extended or adjusted under 35 U.S.C. 154(b) by 0 days.

(21) Appl. No.: 14/664,068

(22) Filed: Mar. 20, 2015

(51) Int. Cl.
  *H01R 13/15*  (2006.01)
  *H01R 13/193*  (2006.01)
  *H01R 13/68*  (2011.01)
  *H01R 13/70*  (2006.01)

(52) U.S. Cl.
  CPC ............. *H01R 13/193* (2013.01); *H01R 13/68* (2013.01); *H01R 13/701* (2013.01)

(58) Field of Classification Search
  CPC .... H01R 13/193; H01R 13/701; H01R 13/68; H01R 9/2625; H01R 13/62966; H01R 13/62933; H01F 27/06
  See application file for complete search history.

(56) References Cited

U.S. PATENT DOCUMENTS

| | | | | |
|---|---|---|---|---|
| 7,980,875 B2* | 7/2011 | Gosis | ............... | H01R 13/62933 439/265 |
| 8,251,714 B2* | 8/2012 | Yeh | .................. | H05K 7/1069 439/330 |
| 8,979,568 B2* | 3/2015 | Herbrechtsmeier | | H01R 13/62966 439/346 |
| 9,073,495 B2* | 7/2015 | Toutant | .................. | B60R 13/01 |
| 2010/0178786 A1* | 7/2010 | Lux | .................... | H01R 9/2625 439/261 |
| 2012/0322284 A1* | 12/2012 | Trinh | .................... | H01F 27/06 439/261 |

* cited by examiner

*Primary Examiner* — Jean F Duverne (57) ABSTRACT

A retention member for use with a junction box. The retention member includes a beam, at least one resilient retention member and securing members. The securing members extend from the beam and are operable between an unsecured position in which the at least one resilient retention member of the beam is not placed in engagement with the at least one electrical component and a secured position in which the at least one resilient retention member of the beam is placed in engagement with and exerts a force on the at least one electrical component. Wherein when the securing member is in the secured position, the at least one resilient retention member of the beam maintains the at least one electrical component in electrical engagement with mating electrical components of the junction box.

20 Claims, 7 Drawing Sheets

RETENTION MEMBER FOR USE WITH AN ELECTRICAL JUNCTION BOX

FIELD OF THE INVENTION

The present invention is directed to retention member and a junction box with a retention member for retaining electrical components in a junction box. In particular, the invention is directed to physically and electrically securing relays and fuses in the junction box.

BACKGROUND OF THE INVENTION

Automotive vehicles include many electrical systems, such as lighting, signaling, instrumentation and engine control. Networks of wires and cables, which run throughout the vehicle, generally interconnect these electrical systems. Each of these electrical subsystems includes numerous electrical components, such as fuses, relays and connectors. In some vehicles, the fuses and relays are distributed throughout the vehicle. Other vehicles have many of the wires and cables routed through an electrical junction box, which houses most or all of the fuses and relays in the vehicle. In this manner, the electrical junction box can be considered as a container for electrical junctions.

As the electronics in vehicles increases, the space provided to house all of the fuses and relays becomes more limited. The junction boxes may also be oriented in any direction from vertical to horizontal. In addition, as the junction boxes are mounted in vehicles, the junction boxes and the fuses and relays are subjected to conditions such as vibration, which may cause the electrical connection between the fuses and relays and the mating components to be ineffective. It is therefore important that the relays and fuses be maintained in electrical contact with the mating components over time.

In order to provide for such a secure connection, covers may be applied to the junction box. One example of known junction boxes comprises a body having electrical parts (such as relays and fuses) mounted thereon and a cover attached to a lower surface of the body. A plurality of elastically-deformable lock piece portions are formed on and project from the body, and lock portions, corresponding respectively to the lock piece portions, are formed at the cover. The lock piece portions are elastically deformed to be retainingly engaged with the lock portions respectively, thereby connecting the cover to the lower surface of the body in a united manner. The cover cooperates with the relays and fuses to maintain the relays and fuses in proper electrical engagement. However, covers are often difficult to access particularly in confined spaces, thereby making difficult the repair and/or replacement of the fuses or relays.

Alternatively, a number of locking terminals may be provided to cooperate with the terminals of the relay or fuse to lock them in position relative to the junction box. Examples of such electrical junction boxes consist of relay terminals, housing members having receiving cavities formed therein for receiving the relay terminals, circuit bodies having mating terminals which mate with the relay terminals, and locking means provided on the relay terminals for locking the relay terminals in the receiving cavities of the housing members. However, such junction boxes suffer from various deficiencies, including the unreliably of the connection over time as the relays can become disassembled.

It would, therefore, be beneficial to provide a junction box in which the fuse and relays are properly positioned and maintained in a secure electrical engagement with the mating components regardless of the orientation and the placement of the junction box. In addition, it would be beneficial to provide a securing mechanism which can be accessed in confined spaces and which allows for the ease of repair and/or replacement of the fuses or relays.

SUMMARY OF THE INVENTION

An embodiment is directed to a retention member for use with a junction box. The retention member includes a beam, at least one resilient retention member and securing members. The beam has a first surface which faces the junction box and an oppositely facing second surface. The least one resilient retention member extends from the first surface of the beam in a direction away from the second surface and is configured to cooperate with at least one electrical component positioned in the junction box. The securing members extend from the beam and are operable between an unsecured position in which the at least one resilient retention member of the beam is not placed in engagement with the at least one electrical component and a secured position in which the at least one resilient retention member of the beam is placed in engagement with and exerts a force on the at least one electrical component. Wherein when the securing member is in the secured position, the at least one resilient retention member of the beam maintains the at least one electrical component in electrical engagement with mating electrical components of the junction box.

An embodiment is directed to an electrical connection box which has oppositely facing sidewalls and oppositely facing end walls, an electrical component receiving recess extending between the sidewalls and the end walls, and retention member mounting posts extending from the end walls. A retention member cooperates with the retention member mounting posts. The retention member includes a beam, a resilient retention member and securing members. The beam has a first surface which faces the junction box and an oppositely facing second surface. The resilient retention member extends from the first surface of the beam in a direction away from the second surface and is configured to cooperate with an electrical component positioned in the junction box. The securing members extend from the beam and are operable between an unsecured position in which the resilient retention member of the beam is not placed in engagement with the at least one electrical component and a secured position in which the resilient retention member of the beam is placed in engagement with and exerts a force on the electrical component. Wherein when the securing member is in the secured position, the resilient retention member of the beam maintains the electrical component in electrical engagement with mating electrical components of the junction box.

An embodiment is directed to an electrical connection box which has retention member mounting members, the retention member mounting members have securing projections provided thereon. A retention member extends between the retention member mounting members. The retention member includes a beam and securing members. The beam has at least one resilient retention member which extends therefrom. The at least one resilient retention member is configured to cooperate with at least one electrical component positioned in the junction box. The securing members extend from the beam and engage the retention member mounting members. The securing members have resilient portions and are operable between an open position in which the resilient portions do not engage the securing projections of the retention member mounting members and a secured position in which the resilient portions are maintained in position proximate the securing projections of the retention member mounting members, wherein the at least one resilient retention member of the beam is placed in engagement with and exerts a force on the electrical component. When the securing members are in the secured position, the at least one resilient retention member of the beam maintains the electrical component in electrical engagement with mating electrical components of the junction box.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Embodiments of the present invention generally provide an electrical junction box 10 for an automotive vehicle. In general, the junction box 10 can distribute electric power to and from electrical wires as well as various electric components electrically mounted within the junction box 10. In addition, the junction box 10 may include relays, fuses, switches and other electronic or electrical components. The junction box 10 may be used in number of locations in the vehicle, such as a passenger compartment, an engine compartment and a boot area of the vehicle. For example, the junction box 10 may hold one or more electronic or electrical components for various electric devices in the engine compartment, such as a cooling fan, an anti-lock brake pump and an engine control unit.

Figure 1:
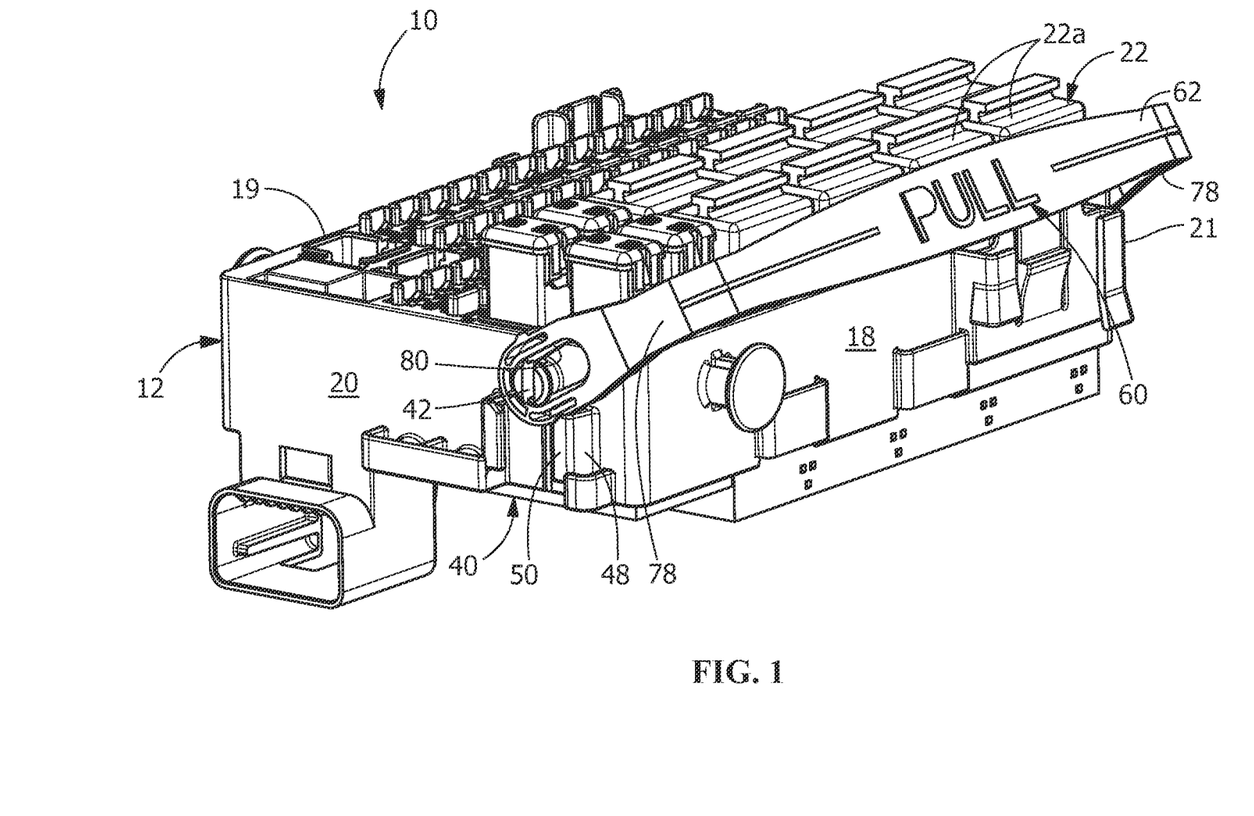
FIG. 1 is a perspective view of an illustrative embodiment of the invention, showing a retention member mounted on a junction box, the retention member being shown in an open or initial position.
Figure 2:
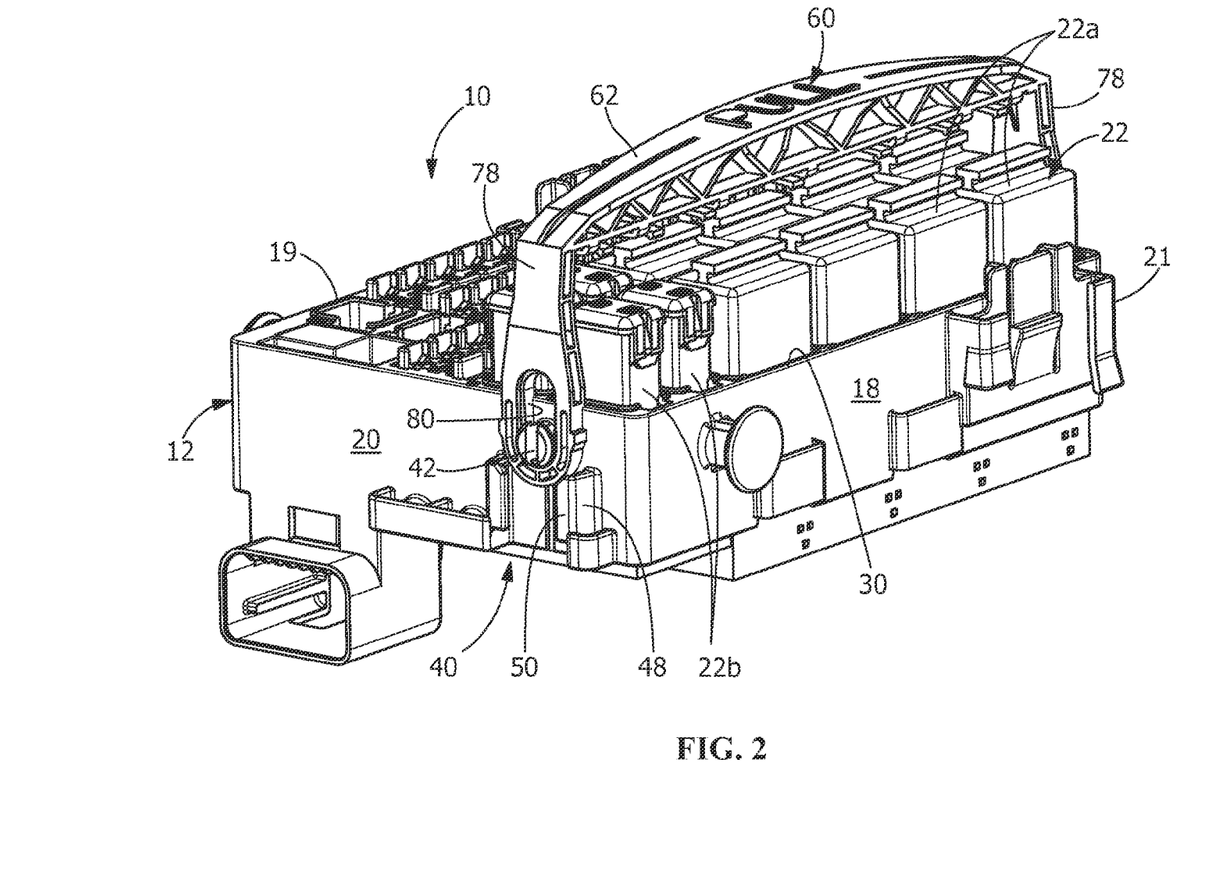
FIG. 2 is a perspective view of the illustrative embodiment shown in FIG. 1, showing the retention member mounted on the junction box, the retention member being shown in an intermediate or unlocked or unsecured position.
Figure 3:
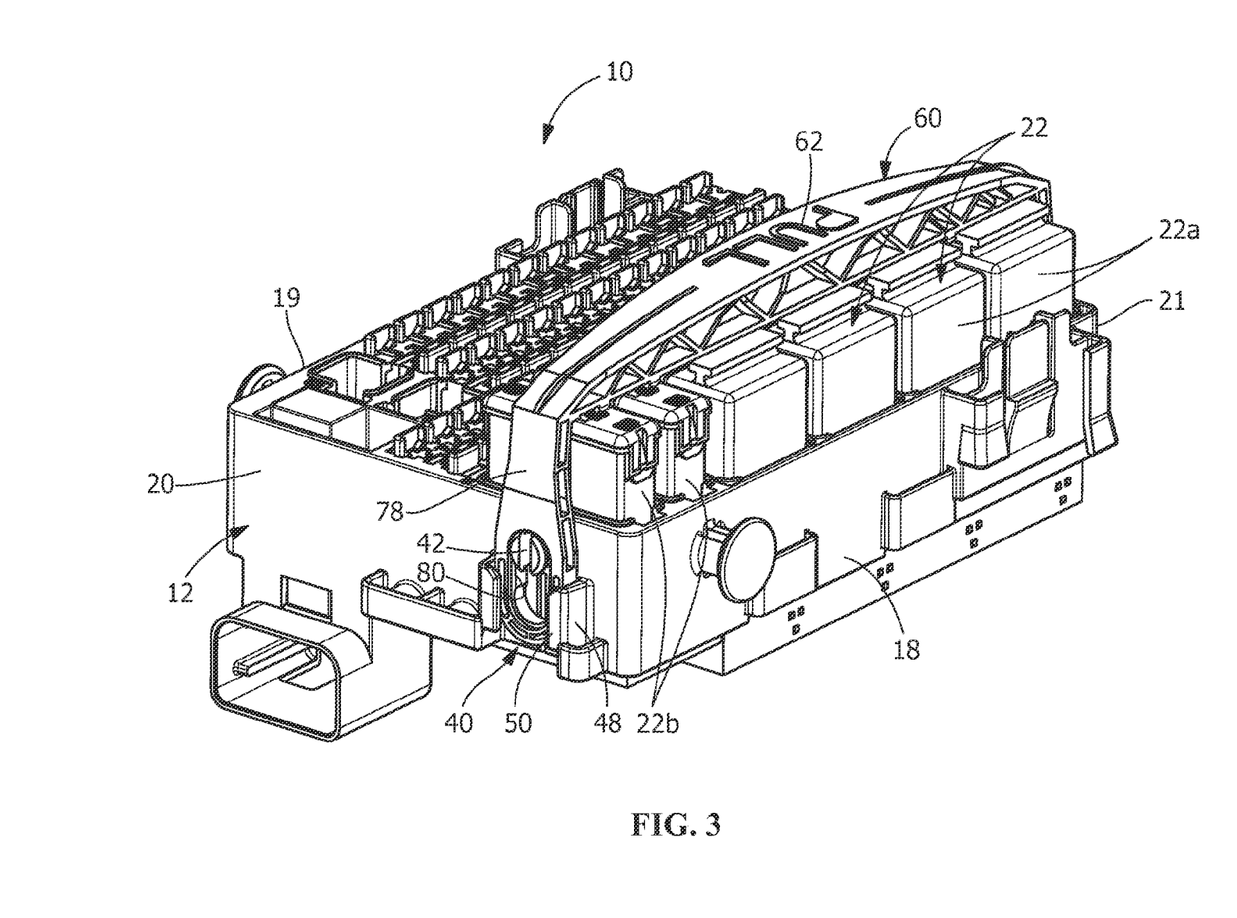
FIG. 3 is a perspective view of the illustrative embodiment shown in FIG. 1, showing the retention member mounted on the junction box, the retention member being shown in a closed or locked or secured position.

With reference to the illustrative embodiment shown in FIGS. 1 through 3, the junction box 10 includes a body 12. In the illustrative embodiment, the body 12 has a generally rectangular shape when viewed from above. However, other shape can be used without departing from the scope of the invention. The body 12 is configured to hold or support one or more electronic or electrical components, such as the circuit board (not shown) to which the electrical components 22 are connected. The body 12 includes an outer perimeter which includes sidewalls 18, 19 and end walls 20, 21. The sidewalls 18, 19 and end walls 20, 21 enclose the electronic or electrical components within the junction box 10. In addition, different runs of raceway or cable may be joined, connected and/or branched to electrical conductors in the junction box 10. The body 12 is made from any nonconductive material having the required strength characteristics. Such materials include, but are not limited to, plastic, polymers and synthetic resins.

As illustrated in FIGS. 1 through 3, the body 12 is adapted to receive a plurality of electrical components 22, such as fuses, switches, relays or other plug-in devices. Each electrical component 22 may have a first conducting tab or leads (not shown) and a second conducting tab (not shown), as is known in the industry. For example, the first and second conducting leads may be metal tabs. As shown, the body 12 includes a plurality of component cavities or receptacles 30 for receiving the electrical components 22. Each of the receptacles 30 is adapted to receive at least a portion of the electrical component 22. In addition, the receptacles 30 can guide the electrical components 22 through the body 12 to facilitate that a proper electrical connection is affected between the electrical component 22 and the junction box 10.

When the body 12 receives one of the electrical components 22, the electrical component 22 may electrically connect to the circuit board or other mating component housed in the body 12. When properly connected, the electrical component 22 can control or regulate current flow to control various components in the vehicle. For example, the electrical component 22 may control power door locks, power seats, turn signals or windshield wipers in the automotive vehicle. The electrical component 22 can be readily inserted and removed from the body 12 and therefore may be referred to as a serviceable or plug-in component.

Figure 4:
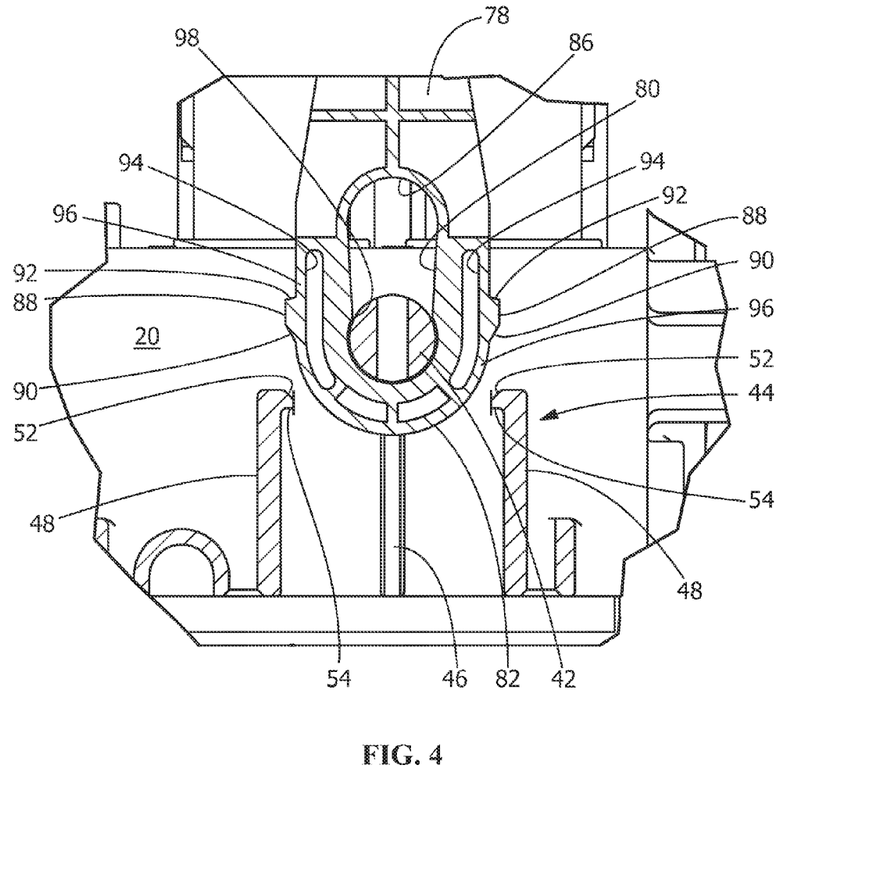
FIG. 4 is an enlarged cross-sectional view of a latching portion of the junction box and a securing member of the retention member when the securing member is in the unlocked or unsecured position, as shown in FIG. 2.
Figure 5:
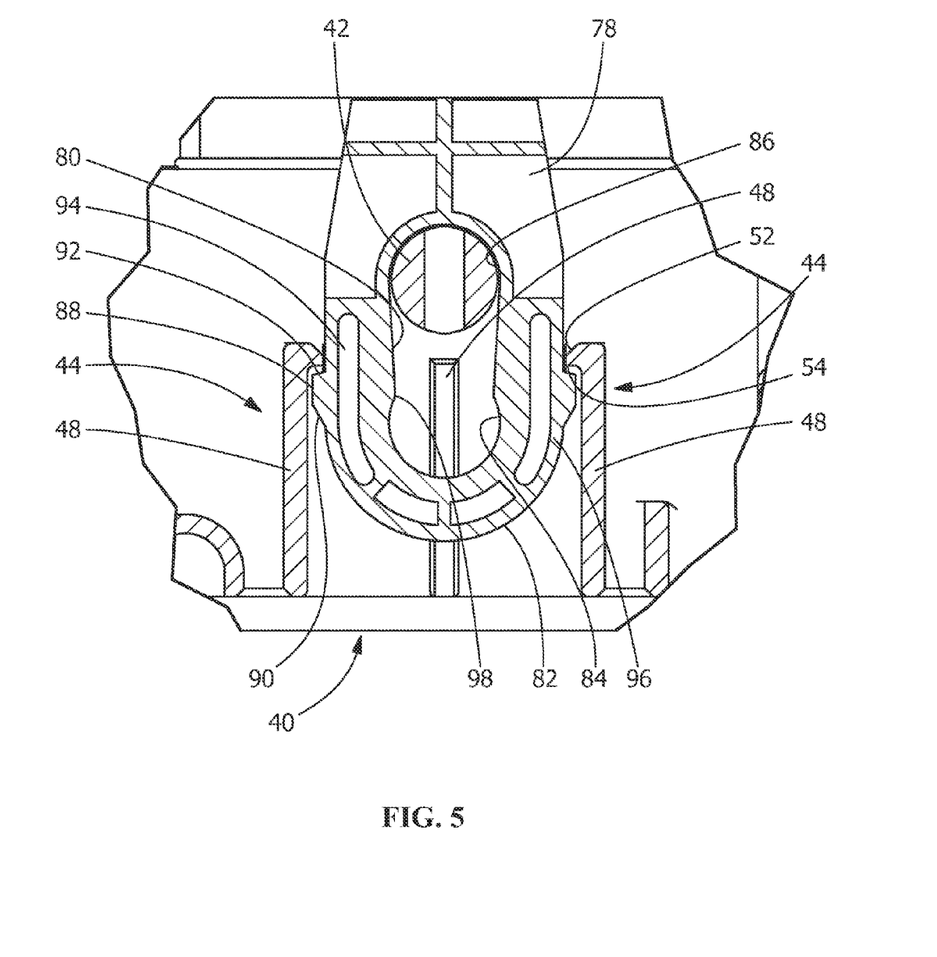
FIG. 5 is an enlarged cross-sectional view of the latching portion of the junction box and the securing member of the retention member when the securing member is in the locked or secured position, as shown in FIG. 3.

Latching portions 40 are provided on each of the endwalls 20, 21. As best shown in FIGS. 4 and 5, each latching portion 40 has a mounting projection or retention member mounting post 42, two latching arms 44 and a biasing projection 46. Each latching arm 44 has a sidewall 48 which extends from the end wall 20, 21 of the body 12 to a resilient end wall 50. Each sidewall 48 has a lead-in surface 52 and a latching shoulder 54.

Figure 6:
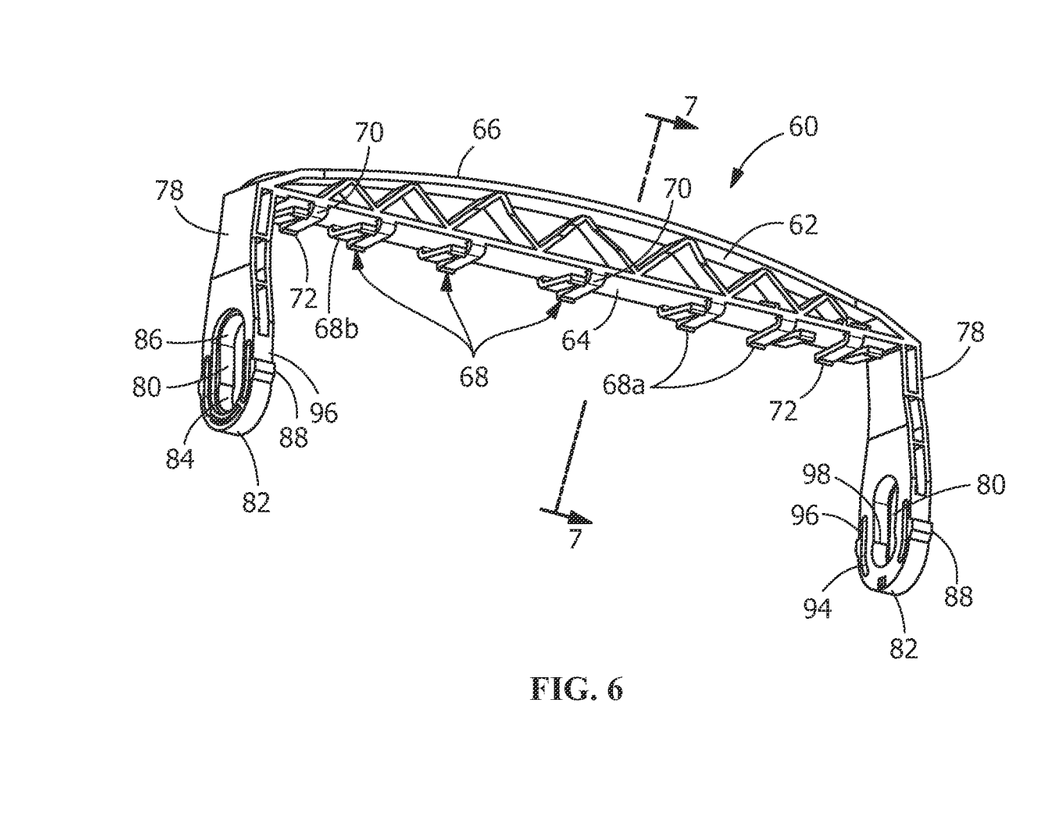
FIG. 6 is a perspective view of the retention member of FIG. 1.
Figure 7:
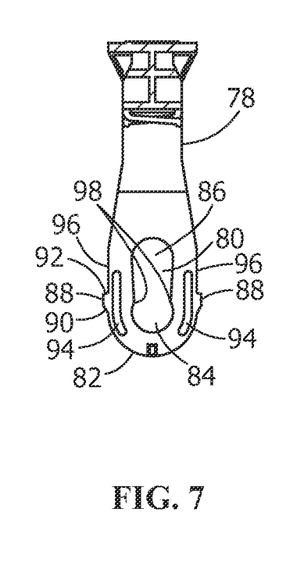
FIG. 7 is an end view of the retention member of FIG. 6.
Figure 8:
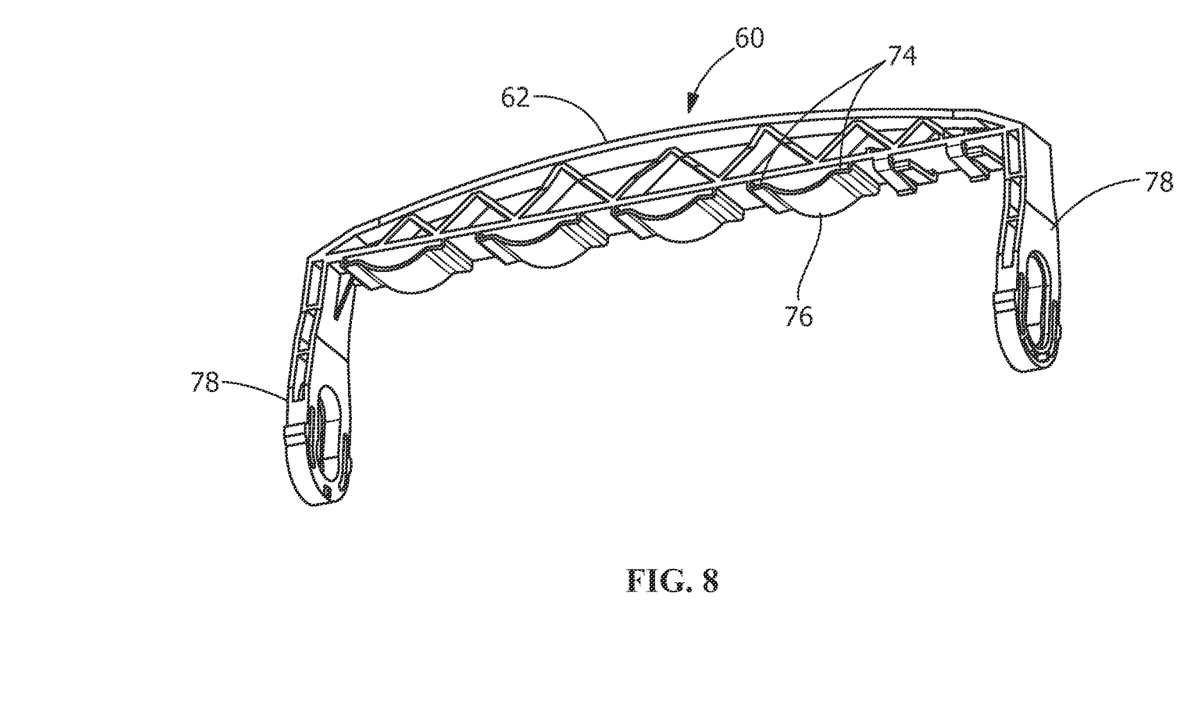
FIG. 8 is a perspective view of an alternate illustrative retention member which can be used with the junction box.

As best shown in FIGS. 1 through 3, a movable or rotatable locking arm or retention member 60 is mounted on the body 12 of the junction box 10. The retention member 60, as best shown in FIG. 6, includes a beam 62 with a first surface 64 which faces the body 12 of the junction box 10 and an oppositely facing second surface 66. At least one resilient retention member 68 extends from the first surface 64 in a direction away from the second surface 66. The at least one resilient retention member 68 is configured to cooperate with at least one electrical component 22 positioned in the junction box 10, as will be more fully described. In the illustrative embodiment shown in FIGS. 1 through 7, seven pairs of retention members 68 are shown. Each retention member 68 is a cantilevered beam which has a fixed end 70 and a free end 72. Each pair of retention members 68 includes two beams with the free ends 72 facing in opposite directions. In the illustrative embodiment shown in FIG. 8, four retention members 69 in combination with two retention members 68 are shown. Each retention member 69 is a resilient beam which is fixed to the first surface 64 at either end 74 and bows in the middle section 76. However, other configurations of the retention members can be used without departing from the scope of the invention.

In the illustrative embodiments shown, retention members 68a are positioned to cooperate with electrical components 22a which are relays and retention members 68b are positioned to cooperate with electrical components 22b which are fuses. However, other configurations and other numbers of retention members 68, 68a, 68b of can be used without departing from the scope of the invention.

Retention member 60 has securing members 78 which extend from either end of beam 62. In the illustrative embodiment shown, the securing members extend at essentially 90 degrees from the beam 62, although other configurations can be used without departing from the scope of the invention.

Each securing member 78 has an oblong or elongated opening 80 provided at a free end 82 of the securing member 78. Each elongated opening 80 has a first section 84 in which the mounting post 42 is positioned when the securing member 78 is in the unlocked position (FIGS. 2 and 4) and a second section 86 in which the mounting post 42 is positioned when the securing member 78 is in the locked or secured position (FIGS. 3 and 5). The diameter of the first section 84 is larger than the diameter of the second section 86. The diameter of the first section 84 is larger than the diameter of the mounting post 42. The diameter of the second section 86 is smaller than the diameter of the mounting post 42.

Each securing member 78 has latching projections 88 provided proximate the elongated opening 80. The latching projections 88 extend from a sidewall of the securing member 78 in a direction away from the opening 80. The latching projections 88 have lead-in surfaces 90 and securing shoulders 92 which cooperate with the latching shoulders 54 to releasably maintain the retention member 60 in the second position, as will be more fully described. Provided between the latching projections 88 and the elongated opening 80 are relief openings 94 which allow the resilient arms 96 on which the latching projections 88 are located to be resiliently displaced as the retention member 60 is moved between the unlocked position (FIG. 2) and the locked position (FIG. 3).

The locking arm or retention member 60 is positioned on the junction box 10 by first sections 84 of openings 80 of the securing members 78 of the retention member 60 over the mounting posts 42 of the latching portions 42 of the junction box 10. The first sections 84 are dimensioned to allow the mounting posts 42 to be inserted therein. In order to properly position the securing members 78 over the posts 42, the securing members 78 are resiliently deformed relative to the beam 62 as the securing members are moved over the posts 42. As the posts 42 are positioned in line with the first sections 84, the securing members 78 return toward their unstressed position, causing the posts 42 to be captured in the first sections 84 of the openings 80, thereby securing the retention member 60 to the junction box 10. The mounting posts 42 are prevented from inadvertently moving to the second sections 86 by shoulders 98 (as best shown in FIG. 4). In this position, the retention member 60 can pivot, rotate or move about the posts 42, allowing the retention member 60 to be moved to the left or right relative to the cavities 30 and the components 22 positioned therein.

In operation, the electrical components 22 are inserted into the cavities 30 of the body 12 of the junction box 10. In the embodiment shown, the electrical components 22 are relays 22a and fuses 22b, but other electrical components can be used without departing from the scope of the invention. As the electrical components 22 are inserted into the cavities 30, the locking arm or retention member 60 is rotated to either the left or right side of the box 10, thereby allowing the unrestricted insertion of the components 22 into the cavities 30. As previously described, the retention member 60 is mounted on the junction box 10 to allow the retention member 60 to rotate either to the left or the right, thereby allowing the rotation member 60 to operate in confined spaces.

With the electrical components properly positioned, the retention member 60 is moved from the initial or first position, as shown in FIG. 1 to the second or unlocked or unsecured position, as shown in FIG. 2. In the unlocked or unsecured position, the beam 62 and the resilient retention members 68 are positioned above the electrical components 22. Additionally, the longitudinal axis of the securing members 78 is positioned essentially parallel to the sidewalls 48 of the latching arms 44.

The retention member 60 is then moved from the unlocked or unsecured position shown in FIG. 2 to the third, secured or locked position shown in FIG. 3. In order to move the retention member 60 from the unlocked or unsecured position to the third position, a force is applied to the beam 62 or other portion of the retention member 60, causing the beam to be moved toward the junction box 10. This causes the resilient retention members 68 mounted on the first surface 64 of the beam 62 to move toward and engage the electrical components 22. As the retention member 60 is moved, the shoulders 98 of openings 80 are moved past posts 42, allowing the second sections 86 of the openings to engage the posts 42. The movement of the retention member 60 also causes the lead-in surfaces 90 of the latching projections 88 to engage the lead-in surface 52 of the latching shoulder 54 of the sidewall 48, causing the resilient arms 96 of the latching projections 88 to resiliently deflect. The continued movement of the retention member 60 causes the latching projections 88 to move past the latching shoulder 54, thereby allowing the resilient arms 96 to move back toward their unstressed position. In this position, the securing shoulders 92 of the latching projections 88 are positioned proximate to or in engagement with the latching shoulders 54 of the sidewalls 48, thereby preventing inadvertent withdraw of the retention member 60 from the locked or third position toward the unlocked or unsecured position.

When the retention member 60 is in the locked or secured position, the resilient retention members 68 exert a force on the electrical components 22 to retain the electrical components 22 in proper position and in electrical engagement with the mating components of the junction box 10. The resilient retention members 68 are configured to exert sufficient force on the electrical components 22 over time and in harsh conditions, such as, but not limited to, during vibration, to maintain a positive electrical connection between the electrical components 22 and the mating components.

When an electrical component is to be repaired or replaced, the beam 62 of the retention member 60 is engaged and pulled away from the junction box 10. As this occurs, the securing shoulders 92 of the latching projections 88 are moved past the latching shoulders 54 of the sidewalls 48. The securing shoulders 92 have a slight incline to facilitate the movement of the securing shoulders 92 past the latching shoulders 54. As this occurs, the shoulders 98 of openings 80 are moved past posts 42, allowing the first sections 84 of the openings to again house the posts 42. When the retention member 60 is in the second or unlocked or unsecured position, the resilient retention members 68 do not exert a force on the electrical components 22. The retention member 60 can them be rotated from the unlocked or unsecured position, as shown in FIG. 2, back to the initial position, as shown in FIG. 1, in which the retention member 60 is moved out of alignment with the cavities 30, thereby allowing the electrical components 22 to be removed from the cavities 30.

The retention member 60 physically and electrically secures the electrical components 22 within the component cavity 30. The retention member 60 allows each electrical component 22 to be removed from its respective component cavity 30 in the event that the electrical component 22 requires maintenance or replacement. The retention member 60 cooperates with the junction box 10 to ensure that the electrical components 22 are properly positioned and maintained in a secure electrical engagement with the mating components of the junction box regardless of the orientation and the placement of the junction box. In addition, the retention member 60 can be accessed in confined spaces to facilitate the ease of repair and/or replacement of the fuses or relays.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and not limited to the foregoing description or embodiments.

The invention claimed is:

1. A retention member for use with a junction box, the retention member comprising:
    a beam having a first surface which faces the junction box and an oppositely facing second surface;
    at least one resilient retention member extending from the first surface of the beam in a direction away from the second surface, the at least one resilient retention member being configured to cooperate with at least one electrical component positioned in the junction box;
    securing members extending from the beam, the securing members being operable between an unsecured position in which the at least one resilient retention member of the beam is not placed in engagement with the at least one electrical component and a secured position in which the at least one resilient retention member of the beam is placed in engagement with and exerts a force on the at least one electrical component;
    wherein when the securing member is in the secured position, the at least one resilient retention member of the beam maintains the at least one electrical component in electrical engagement with mating electrical components of the junction box.

2. The retention member as recited in claim 1, wherein the at least one resilient retention member is dimensioned to cooperate with at least one relay positioned in the junction box.

3. The retention member as recited in claim 1, wherein the at least one resilient retention member is dimensioned to cooperate with at least one fuse positioned in the junction box.

4. The retention member as recited in claim 1, wherein the securing members are provided at either end of the beam.

5. The retention member as recited in claim 4, wherein the securing members extend from the beams at essentially 90 degrees.

6. The retention member as recited in claim 1, wherein the securing members have elongated openings provided at free ends thereof, the elongated openings have a first sections in which mounting posts of the junction box are positioned when the securing members are in the unsecured position and a second section in which the mounting posts are positioned when the securing members are in the secured position.

7. The retention member as recited in claim 6, wherein the securing members have latching projections provided proximate the elongated openings, the latching projections are provided to releasably maintain the retention member in the secured position.

8. An electrical connection box comprising:
    oppositely facing sidewalls and oppositely facing end walls, an electrical component receiving recess extending between the sidewalls and the end walls, retention member mounting posts extending from the end walls;
    a retention member cooperating with the retention member mounting posts, the retention member comprising;
        a beam having a first surface which faces the junction box and an oppositely facing second surface;
        a resilient retention member extending from the first surface of the beam in a direction away from the second surface, the resilient retention member being configured to cooperate with an electrical component positioned in the junction box;
        securing members extending from the beam and engaging the retention member mounting posts, the securing members being operable between an unsecured position in which the resilient retention member of the beam is not placed in engagement with the electrical component and a secured position in which the resilient retention member of the beam is placed in engagement with and exerts a force on the electrical component;
    wherein when the securing members are in the secured position, the resilient retention member of the beam maintains the electrical component in electrical engagement with mating electrical components of the junction box.

9. The electrical connection box as recited in claim 8, wherein the securing members have elongated openings provided at free ends thereof, the elongated openings have first sections in which the mounting posts are positioned when the securing members are in the unsecured position and second sections in which the mounting posts are positioned when the securing member is in the secured position.

10. The electrical connection box as recited in claim 9, wherein the securing members have latching projections provided proximate the elongated openings, the latching projections are provided to releasably maintain the retention member in the secured position.

11. The electrical connection box as recited in claim 9, wherein each of the mounting portions have two latching arms which cooperate with the latching projections to resiliently displace the latching projections as the securing member is moved between the unsecured position and the secured position.

12. The electrical connection box as recited in claim 10, wherein the latching arms have lead-in surfaces and securing shoulders, wherein as the securing members are moved from the unsecured position to the secured position, the lead-in shoulders engage the latching projections, causing the latching projections to resiliently deform to allow the latching projections to move passed the lead-in surfaces of the latching arms.

13. The electrical connection box as recited in claim 11, wherein the securing shoulders cooperate with shoulders of the latching projections to retain the securing members in the secured position.

14. An electrical connection box comprising:
 retention member mounting members, the retention member mounting members having securing projections provided thereon;
 a retention member extending between the retention member mounting members, the retention member comprising;
  a beam having at least one resilient retention member extending therefrom, the at least one resilient retention member being configured to cooperate with at least one electrical component positioned in the junction box;
 securing members extending from the beam and engaging the retention member mounting members, the securing members having resilient portions, the securing members being operable between an open position in which the resilient portions do not engage the securing projections of the retention member mounting members and a secured position in which the resilient portions are maintained in position proximate the securing projections of the retention member mounting members, wherein the at least one resilient retention member of the beam is placed in engagement with and exerts a force on the electrical component;
 wherein when the securing members are in the secured position, the at least one resilient retention member of the beam maintains the electrical component in electrical engagement with mating electrical components of the junction box.

15. The electrical connection box as recited in claim 14, wherein the securing members have elongated openings provided at free ends thereof, the elongated openings have first sections in which the retention member mounting posts are positioned when the securing members are in the open position and second sections in which the mounting posts are positioned when the securing member is in the secured position.

16. The electrical connection box as recited in claim 15, wherein the securing members have latching projections provided proximate the elongated openings, the latching projections are provided to releasably maintain the retention member in the secured position.

17. The electrical connection box as recited in claim 15, wherein each of the mounting portions have two latching arms which cooperate with the latching projections to resiliently displace the latching projections as the securing member is moved between the unsecured position and the secured position.

18. The electrical connection box as recited in claim 16, wherein the latching projections extend from resilient arms.

19. The electrical connection box as recited in claim 18, wherein the latching arms have lead-in surfaces and securing shoulders, wherein as the securing members are moved from the unsecured position to the secured position, the lead-in shoulders engage the latching projections, causing the latching projections to resiliently deform to allow the latching projections to move passed the lead-in surfaces of the latching arms.

20. The electrical connection box as recited in claim 17, wherein the securing shoulders cooperate with shoulders of the latching projections to retain the securing members in the secured position.

* * * * *